United States Patent [19]

Hartz et al.

[11] Patent Number: 4,766,777

[45] Date of Patent: Aug. 30, 1988

[54] INTERRUPTED THREAD LOCK MECHANISM FOR AN ENGINE-TRANSMISSION ASSEMBLY

[75] Inventors: James F. Hartz; Rayman E. Bazilio, both of Indianapolis; Glenn W. Adamson, Danville, all of Ind.

[73] Assignee: The United States of America as represented by the Secretary of the Army, Washington, D.C.

[21] Appl. No.: 874,197

[22] Filed: Jun. 5, 1986

[51] Int. Cl.$^4$ .............................................. F16H 57/02
[52] U.S. Cl. .................................. 74/606 R; 403/349; 29/456; 29/525.1; 464/177
[58] Field of Search ............ 74/606 R; 403/322, 348, 403/349; 285/401, 402, 391; 29/526 R, 456; 248/672; 464/177, 901

[56] References Cited

U.S. PATENT DOCUMENTS

| Re. 30,680 | 7/1981 | Kress et al. ................ 403/349 X |
|---|---|---|
| 1,831,956 | 11/1931 | Harrington ................. 285/391 X |
| 1,910,161 | 5/1933 | Harrington ................. 285/391 X |
| 2,510,377 | 6/1950 | Carr ........................... 403/348 X |
| 2,645,438 | 7/1953 | Kalikow ...................... 403/348 X |
| 2,683,006 | 7/1954 | Nichols . |
| 2,976,569 | 3/1961 | Quere et al. ................ 403/348 X |
| 3,186,188 | 6/1965 | Chew .......................... 464/177 |
| 3,298,484 | 1/1967 | Walischmiller ............. 464/177 X |
| 3,452,617 | 7/1969 | Foster ......................... 74/606 |
| 3,598,392 | 8/1971 | Williamson ................. 403/348 X |
| 4,065,217 | 12/1977 | Andersen et al. ........... 403/322 X |
| 4,269,075 | 5/1981 | Crist et al. .................. 74/606 X |
| 4,566,576 | 1/1986 | Moriya et al. ............... 74/625 X |

FOREIGN PATENT DOCUMENTS

| 418679 | 11/1924 | Fed. Rep. of Germany ........ 74/606 |
|---|---|---|
| 562563 | 10/1932 | Fed. Rep. of Germany ........ 74/606 |
| 319317 | 3/1957 | Switzerland ...................... 403/348 |
| 631618 | 11/1949 | United Kingdom ................ 74/606 |
| 1213271 | 3/1986 | U.S.S.R. ............................. 403/349 |

Primary Examiner—Gary L. Smith
Assistant Examiner—Rodney M. Lindsey
Attorney, Agent, or Firm—Peter A. Taucher; David L. Kuhn

[57] ABSTRACT

A mechanism for operatively connecting an engine and transmission within a vehicle. The mechanism includes a rotary cylinder-like structure 33 having spline lock elements adapted to mesh with spline lock elements carried by an end wall of the engine. A worm-worm wheel assembly or its equivalent is used to effect rotation of the cylinder; self-locking characteristic of the worm-worm wheel unit resists load forces tending to disturb the lock action. An annular housing structure is provided to seal the lock mechanisms from mud, snow, etc. in the ambient atmosphere.

1 Claim, 2 Drawing Sheets

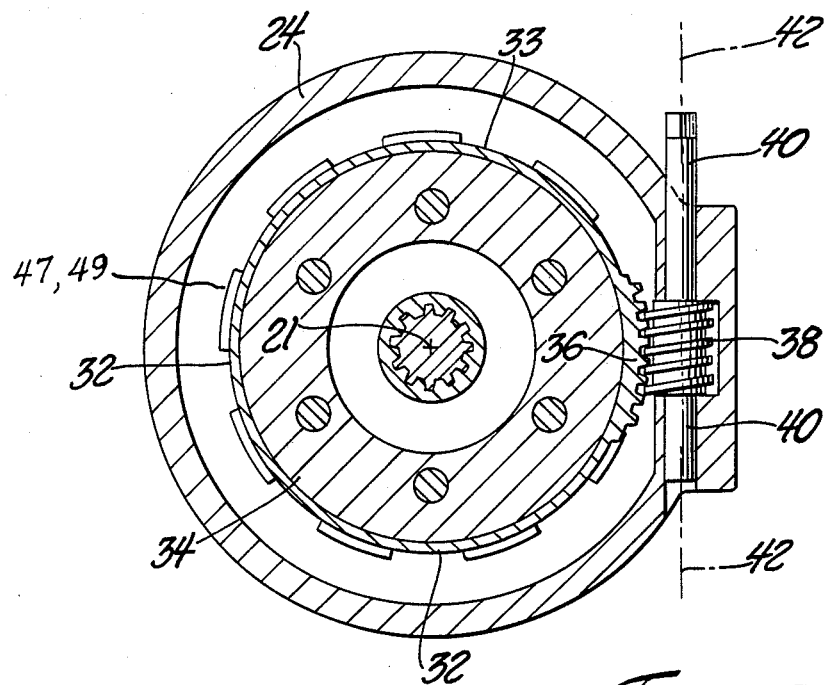
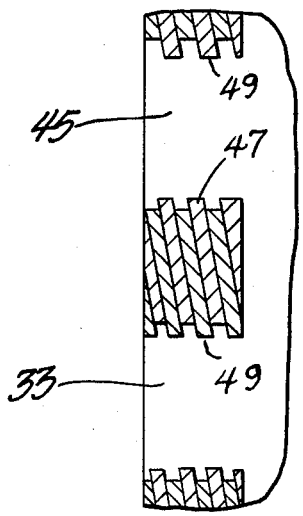
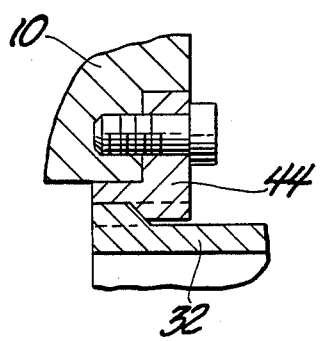
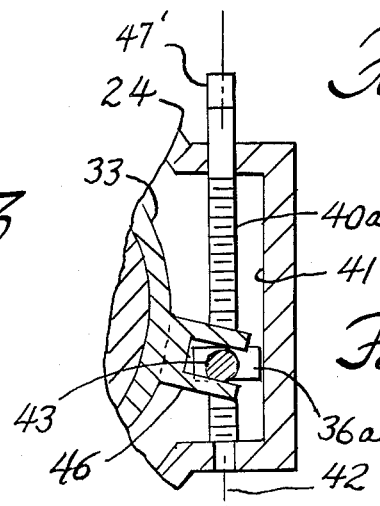

INTERRUPTED THREAD LOCK MECHANISM FOR AN ENGINE-TRANSMISSION ASSEMBLY

GOVERNMENT INTEREST

The Government has rights in this invention pursuant to Contract DAAE07-84-C-R083 awarded by Department of the Army to General Electric Company. The invention described herein may be manufactured, used, and licensed by or for the Government for governmental purposes without payment to us of any royalty thereon.

BACKGROUND AND SUMMARY OF THE INVENTION

This invention relates to improved mechanism for detachably locking an engine and transmission in operative driving relationship. Objects of the invention are to provide an engine-transmission connecting mechanism wherein:

1. the mechanism can be operated between the "power-transmitting" mode and "detached" mode with a single manual actuator device.
2. the above-mentioned actuator device is located in a readily accessible position (in most cases this position would be above the mechanism horizontal centerline).
3. the above-mentioned actuator device comprises a toothed worm-worm wheel assembly having a self-locking characteristic.
4. the mechanism includes locking elements that are located within a housing structure away from atmospheric dirt that could interfere with operation of the mechanism or otherwise adversely affect the useful life of the mechanism.
5. the mechanism takes up comparatively small axial space between the engine and transmission; i.e., the mechanism does not significantly increase the axial dimension of the engine-transmission envelope.

THE DRAWINGS

FIG. 2 is a sectional view taken on line 2—2 in FIG. 1, but on a reduced scale.

FIG. 3 is a fragmentary sectional view on line 3—3 in FIG. 1.

FIG. 4 is a fragmentary sectional view through a structural detail used in an alternate embodiment of the invention.

FIG. 5 is a fragmentary sectional view similar to FIG. 2, but illustrating a modified form of the invention.

THE DRAWINGS IN GREATER DETAIL

Figure 1:
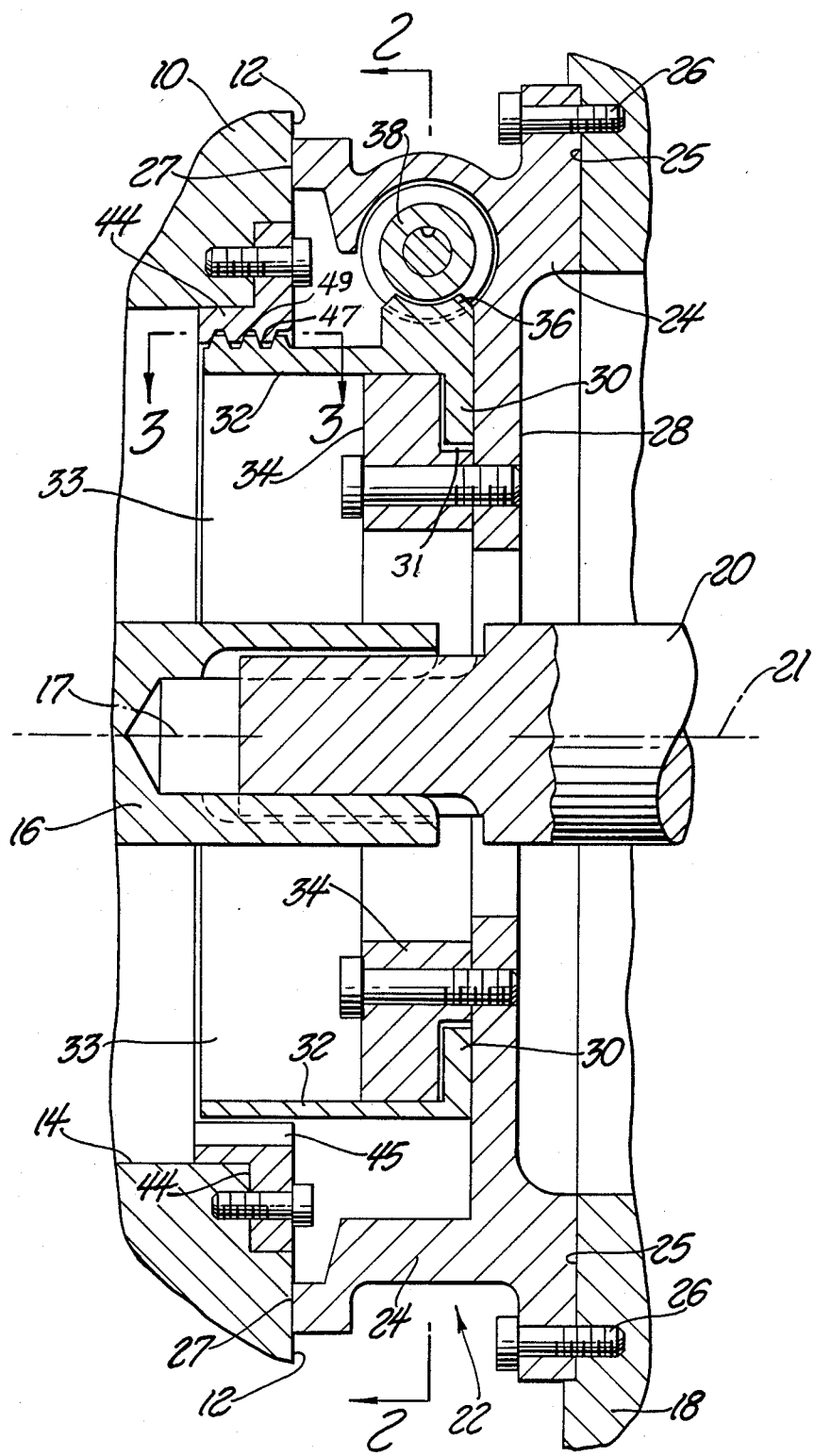
FIG. 1 is a sectional view taken through a locking mechanism constituting one embodiment of the invention.

FIG. 1 fragmentarily illustrates end areas of a conventional engine and transmission modified to utilize our invention. The engine can be a piston engine or turbine engine of various sizes, e.g., a relatively small engine used in a passenger car or a larger engine used in a truck or bus. The engine could also be the type of engine used to power a military tank.

As shown, the engine housing has an end wall 10 having an exterior vertical surface 12 that defines an enlarged circular opening 14 accommodating a drive shaft 16; numeral 17 references the drive shaft axis. The transmission housing includes an end wall 18 to which is bolted an annular housing 24. Housing 24 could be an integral part of the transmission housing. The transmission includes a driven shaft 20 having a rotational axis designated by numeral 21. The two shafts 16 and 20 have splined areas designed to mesh with each other to provide an operative driving connection between the engine and transmission. When the transmission housing is withdrawn to the right (away from the engine) the two shafts 16 and 20 automatically disengage from one another.

Our invention relates to a detachable locking mechanism 22 arrangeable between the engine housing and transmission to rigidly retain them in their operative positions (as shown). A toothed worm device within mechanism 22 is manually operable to disconnect the transmission housing from the engine housing, as necessary for removal of the engine or transmission from the vehicle.

Locking mechanism 22 comprises an annular housing 24 secured to surface 25 of transmission housing end wall 18 by means of bolts 26. Bolts 26 are located so that the central axis of housing 24 is coaxial with shaft axis 21. Left end face 27 of annular housing 24 abuts against end surface 12 of the engine, but is otherwise not permanently attached to the engine structure.

Housing 24 includes an inwardly extending abutment wall or flange 28 whose left face engages a flange 30 on a cylindrical wall 32. Wall 32 and the associated flange 30 form an annular ring structure 33 designed for rotation around axis 21. An annular block-like wall 34 of L-shaped cross-section is bolted to abutment wall 28, so that its outer cylindrical surface slidably engages the inner surface of cylindrical wall 32. Annular wall 34 acts as a bearing for ring structure 33 in the sense that it centers cylindrical wall 32 on the housing 24 axis (that coincides with shaft axis 21). Wall structures 34 and 28 cooperatively form an annular groove 31 that captively receives the aforementioned flange 30 on cylindrical wall 32, such that wall 32 is prevented from appreciable axial motion (to the left or right).

As seen in FIG. 1, groove 31 has a width dimension slightly greater than the axial thickness of flange 30; the clearance condition compensates for a slight axial motion of ring structure 33 as splines 47 and 49 (FIG. 3) move into or out of mesh with one another. In the final tightened-down position of ring structure 33, the left face of flange 30 has pressure engagement with wall 34.

The motive force for producing the desired rotary motion of ring structure 33 is provided by a worm-worm wheel assembly 38, 36. The worm wheel takes the form of a worm wheel segment 36 carried on the outer surface of cylindrical wall 32. The associated worm 38 is suitably secured to an actuator shaft 40 that is oriented on a vertical axis 42 tangent to the circumferential edge of the rotary ring structure 33 (as seen in FIG. 2).

The upper exposed end of actuator shaft 40 has a non-circular cross section designed to interfit with a non-illustrated turning element (wrench, handle, etc). Manual rotation of shaft 40 causes worm 38 to turn worm wheel segment 36 (and the associated cylindrical wall 32) around the housing axis 21. The effective diameter of worm wheel segment 36 is appreciably greater than the diameter of worm 38, e.g., ten or more times. Accordingly, a substantial mechanical force advantage is obtained between shaft 40 and ring structure 33. This is advantageous in achieving a strong (tight) lock action between the engine and transmission.

A characteristic of worm-worm wheel systems is that such systems may be designed to be self-locking by suitable selection of the thread pitch angle. Manual rotational force on actuator shaft 40 is effective to produce rotary motion of ring structure 33; however rotational load forces on ring structure 33 are ineffective to disturb the ring structure position. Worm 38 serves as a detent or brake for ring structure 33. Removal of the brake action requires an intentional manual rotation of shaft 40.

As best seen in FIG. 1, the engine housing has attached thereto a second ring structure 44 coaxial with drive shaft axis 17. Locking elements are carried on ring structures 33 and 44 to rigidly (but disengagably) attach housing 24 to the engine housing when ring structure 33 is rotated (by the aforementioned worm 38).

The locking elements take the form of interrupted threads or splines 47 and 49 carried by structures 44 and 33. The interrupted splines extend generally circumferentially around the respective axes 17 and 21. Splines 47 extend radially inwardly from ring structure 44; splines 49 extend radially outwardly from cylindrical wall 32. As seen best in FIG. 3, the interrupted threads (splines) 47 and 49 are slightly angled away from imaginary radial reference planes, such that rotary motion of ring structure 33 around axis 17 causes structure 33 to shift a slight distance axially (to the right or to the left, depending on the direction of ring structure rotation).

The spline-like locking elements on respective ones of ring structures 33 and 44 are circumferentially spaced from one another, leaving free spaces 45 between adjacent ones of the locking elements. The circumferential dimension of each free space is somewhat greater than the circumferential dimension of the associated locking element, such that when ring structure 33 is initially advanced toward the end wall of the engine the locking elements on ring structure 33 can pass through the free spaces on ring structure 44. With housing end surface 27 abutting against engine housing end face 12 ring structure 33 can be rotated to cause the splines (threads) on structure 33 to move into mesh with the splines on ring structure 44. This locks housing 24 to the engine housing.

The slight angularity of the splines (FIG. 3) produces a pressure lock that should be quite effective in rigidly attaching housing 24 to the engine. Lock effectiveness will be enhanced by the mechanical force advantage between worm 38 and worm wheel 36, and also by the relatively slight angularity of the splines. The locking characteristic of the worm-wheel system (38, 36) should maintain the components in their "power-transmit" conditions in spite of vibrational forces associated with normal engine operation.

As shown in FIG. 1, the spline profile surfaces on the locking elements are triangular or convergent. This convergence is advantageous in that it minimizes any radial rattle or looseness that might otherwise be present between ring structures 33 and 44 due to radial tolerances between the interfitting splines. The convergent spline surfaces center ring structure 33 in ring structure 44 (such that structure 33 is prevented from radial play within structure 44). The left faces of splines 47 and the right faces of splines 49 are non-working faces. They may be spaced from one another as clearance fits while still achieving the desired tight fit of structure 33 within structure 44.

The respective locking elements 47 and 49 can be disconnected by manually rotating worm 38 until the locking elements on ring structure 33 occupy free spaces 45. Housing 24 is movable away from the engine housing by shifting the transmission housing to the right (FIG. 1) via a hoist or similar mechanism.

Some variation in locking element detail may be practiced. FIG. 4 shows locking elements in the form of lugs carried on ring structures 33 and 44. These lugs would be circumferentially spaced in the manner shown in FIG. 3. The confronting faces of the lugs would be convergent and angled, as shown in FIGS. 3 and 1.

FEATURES OF THE INVENTION

The principal advantage of the invention is the fact that the engine housing can be connected/disconnected from the transmission by actuation of a single actuator shaft 40 (FIG. 2). This is in contrast to conventional bolt-on arrangements, where it is necessary to install-/remove a relatively large number (usually twelve or more) stud-nut combinations spaced around the circumference of the engine-transmission housing interface.

In some cases it is difficult to gain access to all of the circumferentially spaced nuts (in conventional arrangements), especially nuts located on the underside of the engine-transmission assembly. This is especially true in military vehicles where the engine-transmission assembly is completely enclosed within the vehicle hull, such that the hull floor is close to the assembly. With our proposed arrangement the actuator shaft 40 is oriented vertically such that it is readily accessible from an access point outside of housing 24. In most cases the access point would be above housing 24. However, in some situations, the access point could be to one side of the housing or possibly even on the underside of the housing. The orientation of shaft 40 would be selected in accordance with particular circumstances.

In some respects our locking mechanism is similar to the lock mechanism shown in U.S. Pat. No. 2,683,006 to A. D. Nichols. However, we employ a worm-worm wheel gear system (38, 36), whereas Nichols employs a conventional nut-screw mechanism. The worm-worm wheel system has a one-way locking characteristic that should be much better in resisting undesired loosening of the mechanism due to vibrational forces.

Our system is also believed to be advantageous over the system proposed in the Nichols patent in that the locking elements (at 33, 44) are completely enclosed within housing 24. In the Nichols arrangement splines 154 and 118 are located in an exterior area where mud, dirt, snow, sand, moisture, etc. could work into the joint to adversely affect the mechanism.

The drawings show housing 24 attached (affixed) to the transmission housing. If desired the housing could be affixed to the engine housing, in which case the detachable connection would be made between the housing and a ring structure carried by the transmission housing. As shown in the drawing, housing 24 may be bolted onto the associated member 18; alternately, housing 24 can be an integral part of member 18. Similarly, ring structure 44 can be bolted to the associated member 10 or it can be an integral part of member 10.

In the system shown in FIG. 1, support element 34 for cylindrical wall 32 is located in radial alignment with worm 38. This is believed advantageous in that support element 34 effectively handles radial forces associated with loadings on the worm-worm wheel teeth. Element 34 preferably has a fairly extensive surface area in contact with cylindrical wall 32, such that radial loads associated with the worm gearing are adequately handled. Major loadings are handled by the spline surfaces on ring structures 33 and 44.

The preferred means for rotating ring structure 33 is a worm-wheel mechanism, as shown in the drawings. However, it is believed possible to use other rotation-producing mechanisms while still practicing the invention.

For example, FIG. 5 fragmentarily illustrates an arrangement comprising a threaded shaft 40a mounted in housing 24 for rotation around an axis 42 tangent to the circumferential edge of ring structure 33. A square nut 36a is threaded onto the threaded area of shaft 40a; a flat face on the nut lies against housing surface 41 to prevent the nut from rotating.

The nut has two laterally-extending stub shafts 43 located within yoke structures 46 carried by ring structure 33. Manual turning force on the external end area 47' of shaft 40a produces the desired rotation of ring structure 33.

We wish it to be understood that we do not desire to be limited to the exact details of construction shown and described for obvious modifications will occur to a person skilled in the art, without departing from the spirit and scope of the appended claims.

We claim:

1. In association with an engine housing (10) having an end surface (12) and a drive shaft (16) extending therebeyond, and a cooperating transmission housing (18) having an end surface (25) and driven shaft (20) extending therebeyond to mate with said drive shaft:

the improvement including a mechanism (22) for detachably locking the engine housing and transmission housing in operative driving relationship;

said locking mechanism comprising an annular generally cylindrical housing (24) secured to said end surface of the transmission housing in concentric relation to the driven shaft axis, said annular housing having an end face (27) adapted to engage the aforementioned end surface of the engine housing; said annular housing comprising an outer annular wall, an inwardly radiating wall (28) connected to said outer wall, and an internal annular wall (34) projecting axially from one face of said inwardly radiating wall, whereby the outer surface of said internal annular wall (34) forms a circumferential bearing surface; said inwardly radiating wall and internal annular wall (34) cooperatively defining an outwardly facing annular groove (31);

a cylindrical ring structure (32) disposed within the annular housing, with an inner surface of said ring structure being slidably engaged on the aforementioned circumferential bearing surface so that the ring structure can rotate on said internal annular wall (34); a radial flange (30) extending inwardly from said ring structure into said annular groove (31); said flange having a lesser axial dimension than the groove whereby the ring structure is capable of limited axial motion within the annular housing; and a worm wheel segment (36) extending outwardly from the ring structure in concentric relation to the ring structure axis;

an actuator shaft (40) rotatably mounted in the annular housing for rotation around the actuator shaft axis; a toothed worm (38) carried on the actuator shaft in operative driving engagement with said worm wheel segment; said actuator shaft having its axis located tangent to the circumferential plane of the worm wheel segment; said actuator shaft extending outwardly through the annular housing to provide an exposed manual actuator section, whereby a manual turning force on the exposed actuator section causes the toothed worm to rotate the worm wheel segment and associated ring structure the ring structure axis;

means forming a plural number of first interrupted circumferential splines (47) on the engine housing in concentric relation to the drive shaft axis; means forming a plural number of second interrupted circumferential splines (49) on said cylindrical ring structure (32) in concentric relation to the driven shaft axis:

said first splines being circumferentially spaced from one another to define spline-free spaces (45) therebetween; said second splines being circumferentially spaced from one another to define spline-free spaces therebetween; whereby movement of the annular housing in an axial direction enables the second splines to move into the free spaces between the first splines;

said actuator shaft (40) being manually rotatable to effect rotation of the ring structure, whereby the second splines can move from the first mentioned free spaces into meshed locking engagement with the first splines:

said first and second splines extending at very slight angles to imaginary radial planes passing through the drive shaft axis and driven shaft axis, respectively, whereby the aforementioned flange (30) exerts an axial force on an associated groove surface to effect a pressure-lock action of the meshed splines.

* * * * *